United States Patent
DeCusatis et al.

(10) Patent No.: US 9,225,483 B2
(45) Date of Patent: Dec. 29, 2015

(54) VIRTUAL DATA CENTER BRIDGING EXCHANGE (VDCBX) PROTOCOL

(71) Applicant: GLOBALFOUNDRIES INC., Grand Cayman (KY)

(72) Inventors: Casimer M. DeCusatis, Poughkeepsie, NY (US); Mircea Gusat, Langnau (CH); Keshav G. Kamble, Fremont, CA (US); Mohanraj Krishnaraj, Milpitas, CA (US); Cyriel J. Minkenberg, Gutenswil (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 131 days.

(21) Appl. No.: 13/875,235

(22) Filed: May 1, 2013

(65) Prior Publication Data
US 2014/0328340 A1 Nov. 6, 2014

(51) Int. Cl.
*H04L 5/00* (2006.01)
*H04L 12/46* (2006.01)
*H04L 12/28* (2006.01)
*H04L 12/54* (2013.01)
*H04L 12/931* (2013.01)

(52) U.S. Cl.
CPC .......... *H04L 5/0032* (2013.01); *H04L 12/4641* (2013.01); *H04L 12/28* (2013.01); *H04L 12/56* (2013.01); *H04L 49/354* (2013.01)

(58) Field of Classification Search
None
See application file for complete search history.

(56) References Cited

U.S. PATENT DOCUMENTS

| | | | |
|---|---|---|---|
| 8,027,354 B1 | 9/2011 | Portolani et al. | |
| 8,208,396 B2 | 6/2012 | Eisenhauer et al. | |
| 8,325,713 B2 | 12/2012 | Chawla et al. | |
| 8,335,236 B2 | 12/2012 | Dhar et al. | |
| 2003/0123446 A1* | 7/2003 | Muirhead et al. | 370/392 |
| 2003/0145117 A1* | 7/2003 | Bhat | 709/249 |
| 2010/0118740 A1* | 5/2010 | Takacs et al. | 370/256 |
| 2011/0007746 A1* | 1/2011 | Mudigonda et al. | 370/395.21 |
| 2011/0261831 A1* | 10/2011 | Sharma et al. | 370/412 |
| 2011/0274114 A1* | 11/2011 | Dhar et al. | 370/401 |
| 2012/0039604 A1 | 2/2012 | Dickens et al. | |
| 2012/0063363 A1* | 3/2012 | Li et al. | 370/255 |
| 2012/0170462 A1 | 7/2012 | Sinha | |
| 2012/0179776 A1 | 7/2012 | Umezuki | |
| 2012/0180047 A1 | 7/2012 | Cardona et al. | |
| 2012/0188870 A1 | 7/2012 | Eisenhauer et al. | |
| 2012/0201130 A1* | 8/2012 | Liu et al. | 370/230 |
| 2012/0254554 A1* | 10/2012 | Nakajima | 711/154 |
| 2012/0275301 A1 | 11/2012 | Xiong | |
| 2012/0331142 A1* | 12/2012 | Mittal et al. | 709/225 |

(Continued)

OTHER PUBLICATIONS

"DCBX VLAN Settings for SR-IOV Adapters," IPCOM000185229D, IBM, Jul. 16, 2009, pp. 1-3.

(Continued)

*Primary Examiner* — Kodzovi Acolatse (57) ABSTRACT

In one embodiment, a system includes processor; and logic integrated with and/or executable by the processor, the logic being adapted to: assign a VLAN type to each of a plurality of VLANs of an architecture; generate a VLAN list type-length-value (vTLV) message; and transmit information to resources based at least in part on the vTLV message, wherein the resources comprise at least one virtual switch and one or more of: at least one physical switch; at least one virtual port; at least one physical port; at least one virtual machine; at least one converged network adapter (CNA); and at least one fiber channel forwarder (FCF).

20 Claims, 4 Drawing Sheets

(56) References Cited

U.S. PATENT DOCUMENTS

2013/0028135 A1    1/2013   Berman
2013/0308647 A1*   11/2013   Rosset et al. ............. 370/395.53
2014/0250220 A1*   9/2014   Kapadia et al. ............... 709/224

OTHER PUBLICATIONS

Wadekar, M., "DCBX Protocol Proposal," QLOGIC, Jul. 16, 2008, pp. 1-11.

* cited by examiner

VIRTUAL DATA CENTER BRIDGING EXCHANGE (VDCBX) PROTOCOL

BACKGROUND

The present invention relates to data center bridging, and more particularly, this invention relates to supporting data center bridging capabilities over virtual Ethernet networks.

In a network architecture, various components of the architecture such as switches, converged network adapters (CNAs), fibre channel forwarders (FCFs), etc. benefit from being able to exchange information with other components of the architecture to establish the configuration of the various components. To provide this capability, conventional architectures employ a data center bridging exchange (DCBX) protocol, which utilizes a link layer discovery protocol (LLDP) to distribute information between pairs of components and ultimately throughout the entire network architecture.

As network architectures develop towards software-defined networks and cloud computing, people are introducing various technologies to virtualize Ethernet connections. This virtualization presents unique challenges regarding establishing the configuration of an architecture including virtual components such as virtual switches, virtual machines, etc. These unique challenges prohibit the use of conventional DCBX protocols (such as LLDP) typically utilized to establish the configuration of architectures lacking virtual components. For example, LLDP does not support virtual fabrics or multi-hop environments and also cannot detect configuration errors between virtual switches.

Accordingly, it would be beneficial to provide the ability to discover resources connected to an architecture including virtual components, and establish the scope and topology of the architecture.

BRIEF SUMMARY

In one embodiment, a system includes a processor; and logic integrated with and/or executable by the processor, the logic being adapted to: assign a VLAN type to each of a plurality of VLANs of an architecture; generate a VLAN list type-length-value (vTLV) message; and transmit information to resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

In another embodiment, a method includes assigning a virtual local area network (VLAN) type to each of a plurality of VLANs of an architecture; generating a VLAN list type-length-value (vTLV) message; and exchanging information with resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

According to another embodiment, a computer program product comprising a computer readable storage medium having program code embodied therewith, the program code readable/executable by a processor to: assign a VLAN type to each of a plurality of VLANs of an architecture; generate a VLAN list type-length-value (vTLV) message; and transmit information to resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a system includes a processor; and logic integrated with and/or executable by the processor, the logic being adapted to: assign a VLAN type to each of a plurality of VLANs of an architecture; generate a VLAN list type-length-value (vTLV) message; and transmit information to resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

In another general embodiment, a method includes assigning a virtual local area network (VLAN) type to each of a plurality of VLANs of an architecture; generating a VLAN list type-length-value (vTLV) message; and exchanging information with resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

According to another general embodiment, a computer program comprising a computer readable storage medium having program code embodied therewith, the program code readable/executable by a processor to: assign a VLAN type to each of a plurality of VLANs of an architecture; generate a VLAN list type-length-value (vTLV) message; and transmit information to resources based at least in part on the vTLV message, wherein the resources comprise at least one virtual switch and one or more of: at least one physical switch; at least one virtual port; at least one physical port; at least one virtual machine; at least one converged network adapter (CNA); and at least one fibre channel forwarder (FCF).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
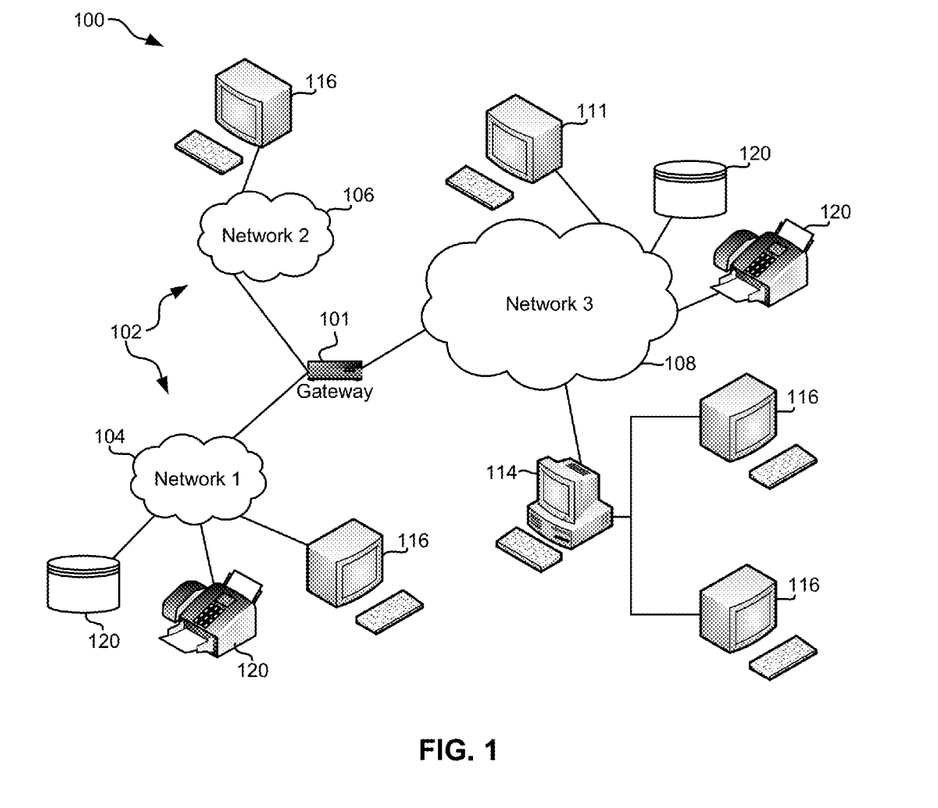
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
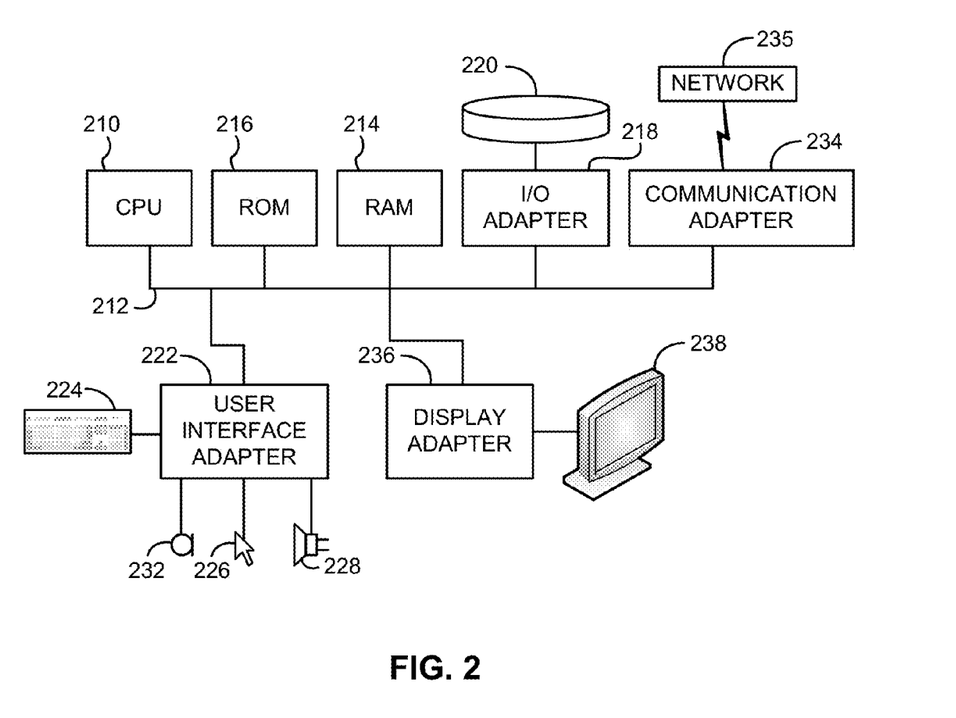
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In preferred architectures, all the switches in the architecture use at least some of the same rules to facilitate moving traffic throughout the architecture. For example, it is particularly useful to determine which switches support particular protocols, such as lossless Ethernet, and which do not. It is possible to do so using a DCBX protocol, which allows adjacent physical switches to exchange information, such as the type of protocols the physical switches support.

For example, in one embodiment an architecture includes two switches, and the switches communicate via a communication protocol. If both switches support lossless Ethernet then a lossless link may be established between the switches, imparting all the features and functionalities of lossless Ethernet to communications between the two switches.

This DCBX-based approach also has implications for supporting fiber channel over Ethernet (FCoE) because FCoE communications may require lossless Ethernet links. In one embodiment, providing a data storage environment, such as a storage area network (SAN) with FCoE, includes determining which switches in the network can participate in various types of fabrics, such as an FCoE fabric. However, this capability does not currently exist for virtual environments, as DCBX (via LLDP) is incapable of performing several functionalities required or strongly desired for proper operation of an architecture including virtual components.

For example, DCBX and LLDP are incapable of: propagating information across virtual resources within an architecture, propagating information across multi-hop environments, determining configuration errors between virtual resources and other resources (virtual or physical) of an architecture, adding virtual resources to an existing architecture without disrupting the architecture configuration, etc. Lacking any one of these functionalities is a significant disadvantage to any architecture including virtual resources, and being unable to propagate information across virtual resources within an architecture can be a fatal deficiency to architectures requiring or including virtual resources.

Accordingly, the presently disclosed embodiments enable the switching elements establish the topology and the scope of the architecture. In one embodiment, a protocol allows various components of the architecture to discover resources that are attached to and/or in communication with various switches, to establish the scope of the network. The protocol may also enable the architecture to determine various communication protocols (such as lossless Ethernet) supported by various switch elements in the architecture. Providing this functionality across physical and virtual components of an architecture makes it possible to build a FCoE storage environment with access to virtual and/or physical architecture components, as well as to add new virtual switches to an existing network topology without breaking the architecture, e.g. by disrupting the topology that other components of the architecture may be using.

Figure 3:
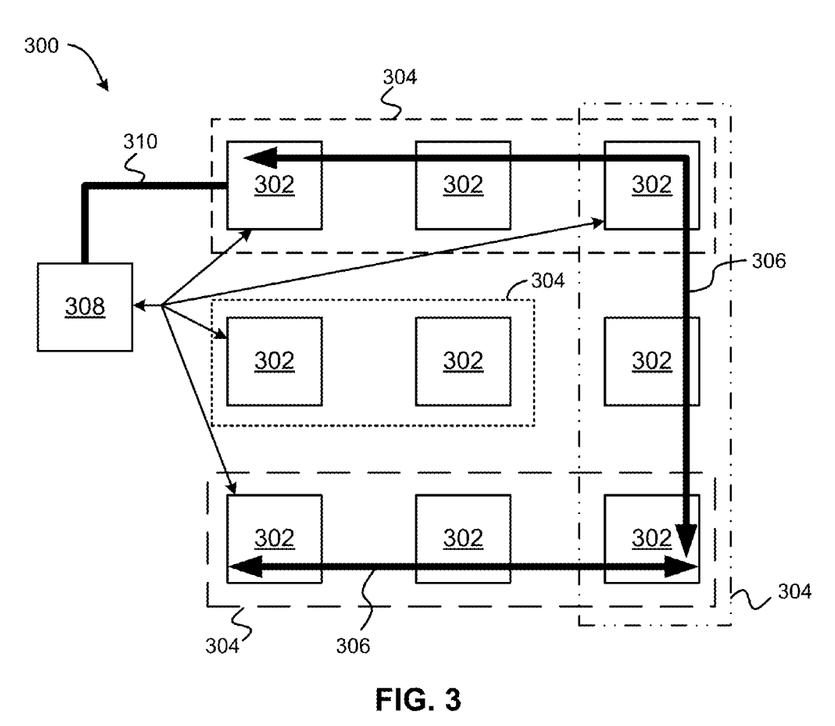
FIG. 3 is a schematic diagram of an architecture, according to one embodiment.

Now referring to FIG. 3, an architecture 300 is shown, according to one embodiment. The architecture 300 represents an exemplary architecture suitable for use in conjunction with the presently disclosed vDCBX functionalities, techniques, computer program products, etc. Of course, other architectures may also be utilized in conjunction with vDCBX techniques described herein without departing from the scope of the instant descriptions.

As shown in FIG. 3, an exemplary architecture 300 includes a plurality of resources 302. Resources may include any type of suitable physical and/or virtual component of an architecture 300. In various illustrative embodiments, resources 302 may include any combination of physical switches, virtual switches, physical ports, virtual ports, physical machines, virtual machines (VMs), converged network adapters (CNAs), fibre channel forwarders (FCFs), etc. as would be understood by one having ordinary skill in the art upon reading the present descriptions.

As understood herein, a "virtual switch" is considered a switch that runs in software, e.g. at an architecture hypervisor. In some approaches, a virtual switch may be embodied as a piece of software running on a server. In operation, the virtual switch reserves bandwidth from the CPU processing cycles, as well as input/output (I/O) bandwidth on the architecture to perform virtual switching operations.

In one embodiment, resources 302 may be adapted for communicating information with other components of the architecture 300, including other resources 302, CNA(s) 308, FCF(s), various resources 302 of a storage area network (SAN), etc. In one approach, at least some of the resources 302 may be adapted for communicating information with adjacent resources 302, as would be understood by one having ordinary skill in the art upon reading the present descriptions.

In addition, the various combinations of the plurality of resources 302 may be in communication via one or more networks 304, which may include local area networks (LANs), virtual local area networks (VLANs), storage area networks (SANs), etc. The various resources 302 may be characterized by supporting one or more protocols (not shown) for communicating data throughout the architecture 300, such as a standard Ethernet protocol, lossless Ethernet protocol, fibre channel over Ethernet (FCoE) protocol, etc. as would be understood by one having ordinary skill in the art upon reading the present descriptions. In one embodiment, each resource 302 in communication via a particular network 304 supports at least one common protocol, such that a data path 306 may be defined within the particular network 304 for communicating data between, to, or via the resources 302 of the particular network 304 according to the common protocol. In a preferred embodiment, at least one of the networks 304 includes a data path 306 for communicating data among and/or via a plurality of resources 302 according to a lossless Ethernet protocol. Of course, data paths 306 may also be defined to facilitate communicating data among a plurality of resources 302 that are in communication via more than one network 304.

The architecture 300 may also include at least one CNA 308 adapted for receiving, processing, and/or exchanging information with a plurality of resources 302. In a preferred embodiment, as discussed in further detail below with regard to method 400 and FIG. 4, the CNA 308 is particularly adapted for facilitating the exchange of information among both virtual resources 302 and physical resources 302 such that the scope and topology of the architecture 300 are established and known across all end-to-end configurations of the resources 302.

As understood herein, the "scope" of an architecture 300 includes information regarding the capabilities of the architecture 300, which in various embodiments may include one or more of the number of resources 302 available to the architecture 300, the type of various resources 302 available to the architecture 300, the capabilities of various resources 302 available to the architecture 300, etc. as would be understood by one having ordinary skill in the art upon reading the present descriptions.

Similarly, as understood herein the "topology" of an architecture includes information regarding the arrangement of capabilities of the architecture 300, which in various embodiments may include one or more of the absolute physical location of various resources 302 available to the architecture 300, the relative location of various resources 302 available to the architecture 300, definition(s) of one or more data paths 306 (e.g. end-to-end connections of resources 302 along the data path 306, protocols supported along the data path 306, network(s) that the data path 306 traverses in whole or in part, etc.) and any other information regarding the arrangement of capabilities available to the architecture 300, as would be understood by one having ordinary skill in the art upon reading the present descriptions.

In one exemplary embodiment, each resource 302 may have direct or indirect access to configuration information for other resources 302, and using the configuration information, each resource 302 may be "aware" of various capabilities other resources 302 of the architecture 300 are configured to perform (such as communicating data according to a particular protocol like a lossless Ethernet protocol). By providing components and/or techniques that enable exchanging such configuration information among both physical resources and virtual resources, the scope and topology across the entire architecture 300 can be readily known based on information exchanged among resources 302. Moreover, additional resources 302 may be added to the architecture 300 without disrupting the scope and/or topology of the architecture 300. and the In a preferred embodiment, the CNA 308 is in communication with at least one resource 302 via high-speed, high-fidelity connection 310 such as a lossless Ethernet with FCoE connection. In some approaches, the at least one resource 302 may be a FCF or other type of FCoE-enabled physical or virtual switch. The connection 310 facilitates communication between various resources 302 using a lossless Ethernet protocol, for example as may be particularly advantageous for facilitating communication between networks that do not support the same protocols, such as communications between a LAN or VLAN that only supports standard Ethernet protocols, and a SAN that requires lossless Ethernet protocol support, in various embodiments.

Figure 4:
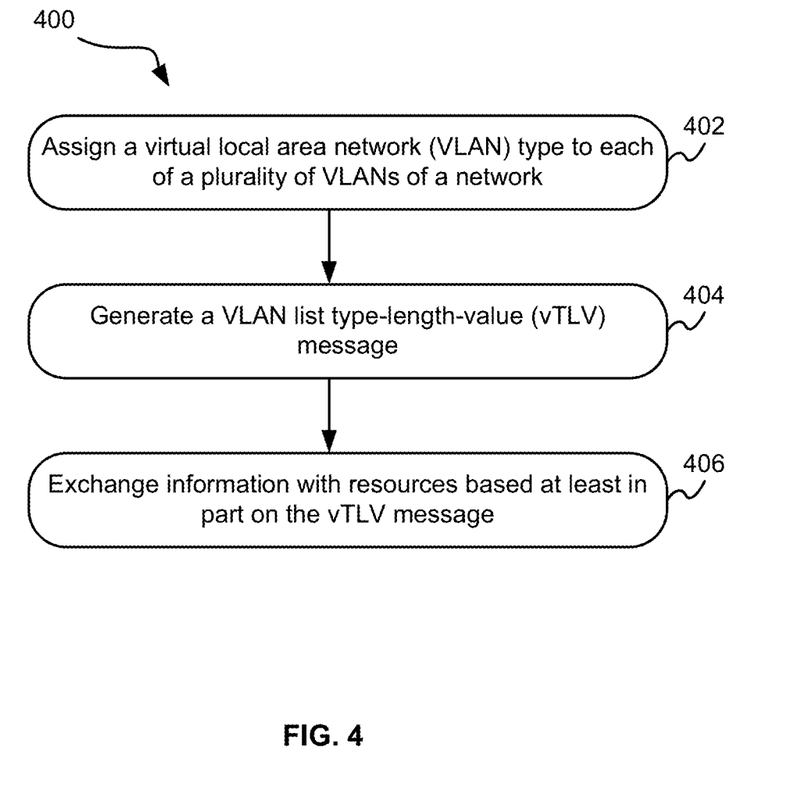
FIG. 4 is a flowchart of a method, according to one embodiment.

Referring now to FIG. 4, a method 400 is shown, according to one embodiment. Method 400 may be performed in any suitable environment using any suitable combination of physical and/or virtual components, including those described above and depicted in FIGS. 1-3. Method 400 may be implemented in a system, device, apparatus, and/or computer program product. For example, method 400 may be implemented in an adapter, an access switch, a switch, a router, a server, or any other networking device. Moreover, the networking device may be either a physical device or a virtual device, in various approaches.

Moreover, while method 400 includes operations 402-406 as shown in FIG. 4, one having ordinary skill in the art reading these descriptions will appreciate that the method 400 may include additional and/or alternative operations as described herein without departing from the scope of the instant disclosure. In addition, the operations depicted in FIG. 4 may be performed in any suitable order without departing from the scope of this disclosure.

Of course, any of the other embodiments and/or approaches described in regard to method 400 may be implemented in any of the systems, devices, and/or computer program products in various other embodiments.

In operation 402, a virtual local area network (VLAN) type is assigned to each of a plurality of VLANs of an architecture. In various approaches, the architecture comprises one or more fabrics, such as an Ethernet fabric, a lossless Ethernet fabric, a FCoE fabric, a PCI express (PCIe) fabric, an Infiniband fabric, etc. as would be understood by one having ordinary skill in the art upon reading the present descriptions.

In general, any fabric type may employ the presently disclosed vDCBX techniques based at least in part on using a one to one logical mapping between the various components of the fabric and a construct of virtualized DCBX in order to operate across the fabric.

For example, regarding Infiniband fabrics, while VLANs in Ethernet fabrics have associated therewith VLAN priorities, in Infiniband fabrics, a total of 16 virtual lanes may be utilized for prioritization instead of VLAN priorities. While Ethernet fabrics may permit only 8 priorities, Infiniband fabrics permit 16 virtual lanes, and may not have any direct equivalent of a VLAN. However, those having ordinary skill in the art will understand that the presently described principles may be applied to the physical and logical spaces utilized in Infiniband fabrics. The principles disclosed herein may similarly be applied to PCIe fabrics.

In some approaches the logical mapping may be accomplished via encapsulation. For example, for Infiniband or PCIe, one approach may include transporting or encapsulating the Ethernet to ensure the encapsulation is component-aware. Transport/Encapsulation may be accomplished by tunneling across the Infiniband or PCIe fabric to build a vDCBX. For example, building the vDCBX may include provisioning a claim saying in case we use tunneling this would be appropriately aware of the DCBX, it would be properly implemented.

In more approaches, the logical mapping may include logically mapping a VLAN construct to an Infiniband construct or a PCI construct, logically mapping an Infiniband construct to a VLAN construct or a PCIe construct, logically mapping a PCIe construct to a VLAN construct or an Infiniband construct, etc. as would be understood by one having ordinary skill in the art upon reading the present descriptions. Logical mapping may be accomplished using any known methodology, in various approaches.

In operation 404, a VLAN list type-length-value (vTLV) message is generated. The vTLV message may be generated as part of a virtual DCBX (vDCBX) message, in one embodiment. In various approaches, the vTLV message may include at least one device entry, and each device entry may correspond to at least one of the VLANs.

The vTLV message represents a new TLV type adapted to provide the presently disclosed functionality for virtual environments. In some embodiments, via the vTLV message, virtual switches of an architecture may be provided with a discovery capability that can find other virtual switches. The virtual switches are thus provided the exchange capability to communicate to each other what capabilities each switch supports, and exchange configuration information between their neighboring virtual switches to ensure that the overall fabric configuration is consistent. The overall fabric configuration includes conditions such as the core network understanding all of the end-to-end configuration mechanisms in the architecture, and a mechanism for prioritizing frames based on how data is encapsulated, in some approaches.

For instance, in one embodiment a fabric configuration includes a FCoE frame that is encapsulated in an underlay, which may be any existing or pending industry standard underlay such as a virtual exchange local area network (VX-LAN). It is problematic if data hits a switch that doesn't understand the particular underlay for the data. In one embodiment, the presently disclosed inventive techniques allow switches to recognize all of the prior frame encapsulation stages without changing the underlying hardware. Rather, the switches may perform frame encapsulation recognition in software only.

To facilitate this functionality, it is advantageous to ensure several conditions are satisfied. First, before communication starts on an architecture, it is beneficial to sync up various adapters with VLANs, as well as any fiber channel forwarder (FCF) that may be optionally included in the architecture. Second, it is advantageous for various resources to advertise themselves on the architecture, which may be accomplished with a virtual datacenter bridging message such as the presently disclosed vTLV message.

For example, in one illustrative embodiment virtual datacenter bridging may be enabled by assigning certain types to VLANs, so some VLANs are used for FCoE, some for regular Ethernet, some for other traffic, etc. Based on the assigned type, it is possible to generate a list of VLANs as a new type of TLV, known as a VLAN-listed TLV (vTLV). The VLAN-listed TLV may be assigned at the network adapter, which may be a converged network adapter (CNA), in some embodiments. Based on the VLAN-listed TLV, the CNA may become aware of the purpose for which the architecture is using each of the listed VLANs. The VLAN-listed TLV is stored in a network adapter of the architecture, providing the adapter a list of VLANs in the network, along with unique identifiers for each VLAN. Moreover, based on the VLAN-listed TLV, the adapter is capable of determining what traffic priority levels are supported for each VLAN.

In some approaches, for every device entry the VLAN list has a protocol identifier defining the supported protocol(s), such as FCoE, Ethernet, etc. In addition, the VLAN-listed TLV lists the number of VLANs that are assigned to that protocol ID and the relative priority of each VLAN supporting the protocol. Of course, in various approaches a network may have multiple VLANs with the same priority. Moreover, VLAN priority can be reassigned in real-time without breaking the network topology or scope. Preferably, all the network switches in any given data path recognize the vTLV message, including physical and virtual switches.

In one embodiment, the virtual switches may accomplish virtual switching operations using the vTLV to determine traffic type and priority level of various resources in a data path and/or of data traversing the architecture.

In further approaches, each device entry represents a unique VLAN identifier; a VLAN traffic priority level for each supported VLAN protocol, e.g. a protocol-dependent priority of a particular VLAN relative to all other VLANs assigned to that protocol; and a VLAN protocol indicator. In some approaches, each device entry may also indicate the number of VLANs assigned to a particular protocol, as well as optionally indicating the corresponding VLAN identifier for each VLAN assigned to the particular protocol. Preferably, the device entries represent any or all of the above information in accordance with type-length-value conventions, which includes representing the information in a type-length-value format.

For example, in one embodiment a vTLV message includes three device entries. A first device entry includes two unique VLAN identifiers, one each for a first VLAN and a second VLAN. The first device entry also includes an indication that each of the first VLAN and the second VLAN support a lossless Ethernet protocol, and an indication that the first VLAN has a traffic priority level "one," while the second VLAN has a traffic priority level "two" (i.e. the first VLAN has a higher traffic priority than the second VLAN). A second device entry includes a unique VLAN identifier for a third VLAN, an indication that the third VLAN supports a standard Ethernet protocol, and an indication that the third VLAN has a traffic priority level "three" (i.e. lower than both the first and second VLANs). A third device entry includes a unique VLAN identifier for a fourth VLAN, an indication that the fourth VLAN supports a FCoE protocol, and an indication that the fourth VLAN has a traffic priority level "one."

In another embodiment, method 400 additionally and/or optionally includes assigning a VLAN traffic priority level to one or more of the VLANs. VLAN traffic priority levels may be assigned in any suitable manner using any suitable physical and/or virtual component(s) of the architecture. In one embodiment, assigning a VLAN traffic priority level includes defining or modifying a device entry in the vTLV message, where the device entry includes a traffic priority level definition for the VLAN to which it corresponds. The VLAN to which a device entry corresponds may be determined, for example, by evaluating a VLAN identifier in the device entry of the vTLV message.

VLAN traffic priority levels may also be modified for one or more VLANs by modifying the VLAN traffic priority level indicator in the corresponding device entry or entries within the vTLV message, in some approaches. For example, it may be advantageous to cyclically assign a VLAN serving a plurality of user workstations using a standard Ethernet protocol to a relatively high priority during peak business hours (e.g. 8 am to 6 pm) when users will likely be putting a heavy load on the VLAN, and to reassign that VLAN to a relatively low priority during off-peak hours (e.g. 8 pm to 6 am) when users are unlikely to be requiring significant resources via the VLAN. In this manner, it may be possible to reallocate those resources to another VLAN, for example a VLAN serving a plurality of data storage resources (e.g. as part of a SAN) during off-peak hours, when data backup operations require significant resources. In this and other similar manners that will be appreciated by one having ordinary skill in the art upon reading the present descriptions, the vDCBX techniques disclosed herein enable optimal resource allocation across architectures that include and/or rely on virtual resources in addition to physical resources.

VLAN traffic priority level modification may be performed in any suitable manner using any suitable resource, and in one embodiment may be performed at least in part using a processor of a CNA, and/or logic integrated into or executable by a processor of a CNA.

Moreover, based at least in part on evaluating the vTLV message, it is possible for various resources to reserve VLANs based in whole or in part on the corresponding VLAN type and/or VLAN traffic priority level. For example, it may be preferable to restrict resources requiring a particular protocol to utilizing VLANs that support that protocol, to restrict resources dedicated to performing urgent tasks to VLANs that have a highest traffic priority level, to dedicate particular VLANs to particular tasks according to a schedule, etc. Utilizing information about the various VLANs, which may be gleaned from the vTLV message, the architecture may perform any of these reserving operations, among others appreciable by one having ordinary skill in the art upon reading the present descriptions.

In operation 406, information is exchanged with resources of the architecture based at least in part on the vTLV message. In particular, the resources include at least one virtual switch and one or more of: at least one physical switch; at least one virtual port; at least one physical port; at least one virtual machine; at least one converged network adapter (CNA); and at least one fibre channel forwarder (FCF). In preferred approaches, the information is exchanged in accordance with a vDCBX protocol.

In various approaches, exchanging information with resources of the architecture may include distributing the information to the resources from a single point of origin (such as a CNA), exchanging information between resources (such as a plurality of switches), replicating the information across each data link in the architecture, modifying an existing transport protocol to exchange the information, etc. as would be understood by those having ordinary skill in the art upon reading the present descriptions. wherein the information is exchanged between adjacent resources. Where "adjacent resources" may be understood to include configurations such as: (1) a first resource and all resources within one "hop" of the first resource (e.g. all resources within a "single-hop" environment); (2) a first resource and all resources with a direct physical or virtual connection to the first resource (e.g. a physical or virtual data connection between a physical or virtual port of the first resource and a physical or virtual port of the "adjacent" resource); (3) all virtual machines on a particular server, etc. as would be understood by one having ordinary skill in the art upon reading the present descriptions. In one particular embodiment, adjacent resources comprise a plurality of adjacent switch pairs, where the plurality of adjacent switch pairs include physical switches and virtual switches.

In some embodiments, the exchanged information includes configuration information regarding the various resources. Configuration information may be understood to include any information corresponding to one or more of: resources to which one or more of the resources are connected, functionalities supported by one or more of the resources; a configuration of one or more of the functionalities on the resource(s), e.g. which ports support the functionalities, ports to which the resource is connected and/or with which the resource is in communication; and a traffic priority level of one or more of the resources.

In various embodiments, exemplary "functionalities" may be understood to include Ethernet functionalities; lossless Ethernet functionalities; native fibre channel (FC) functionalities; fibre-channel over Ethernet (FCoE) functionalities; FCoE initialization protocol (FIP) functionalities; fibre-channel forwarding (FCF) functionalities; priority-based flow control (PFC) functionalities; enhanced transmission selection (ETS) functionalities; Quantized Congestion Notification (QCN) functionalities; data center bridging exchange (DCBX) functionalities; layer-two transport protocol (L2TP) functionalities, etc. as would be appreciated by a skilled artisan upon reading the present descriptions.

In a preferred embodiment, information is exchanged with resources in adherence with L2TP standards. For example, according to the L2TP, in some approaches information may be exchanged via inter-switch communications, e.g. link-to-link communications or multi-hop communications. Alternatively, information may be exchanged by altering an existing inter-switch transport protocol (such as an autonomous transport protocol (ATP) currently used for stacking Broadcom switch chips). Information may also be exchanged by replicating the vTLV across all Ethernet data links to all switches in a data path. However, L2TP has been experimentally determined to advantageously consume less data bandwidth and more efficiently communicate information across a network as compared to either altering an existing (legacy) protocol or exhaustively replicating the vTLV across all Ethernet data links to all switches in a data path.

In a particularly preferred embodiment the L2TP is used to broadcast vTLV messages between switches, enabling all the switches in the architecture to be aware of the scope and topology of the architecture.

In one illustrative approach, exchanging information in a multi-hop environment according to the presently disclosed vDCBX techniques may involve receiving a DCBX message via an intelligent unicast replication protocol at a FCF of the network; responding to the message; and receiving a confirmation message at the FCF. The confirmation message indicates at least one of: a VLAN associated with the FCF; and a CNA port associated with the FCF. Moreover, responding to the message may include informing a CNA of the architecture how to log in to the FCF.

In one approach, vDCBX messages are the first transmission to go out on the architecture, before any VLAN requests or other traffic. Next, intermediate switch(es) on the architecture broadcast the vDCBX messages out of all ports of the intermediate switch(es). For example, all ports enabled for lossless Ethernet may be flooded with vDCBX messages, in one embodiment. This approach ensures the vDCBX message information is distributed throughout the fabric. In some embodiments, eventually one of the vDCBX messages is received at a specialized architectural component or resource, such as a fiber channel forwarder. The specialized architectural component or resource recognizes that and responds to the broadcast packet, in this manner a network adapter, such as a CAN, learns how to log into the FCF.

In addition, in some embodiments the adapter may send out another message to the FCF confirming that the FCF is associated with a certain VLAN and a certain adapter. In a multi-hop environment, this intelligent unicast replication technique may be utilized to broadcast the vDCBX message, to flood all your lossless Ethernet ports with the vDCBX message until the FCF is located. The FCF may respond, upon being located, via a login process. In response to completing a login process, an additional message confirming association(s) between VLANs, FCF and/or adapters may be broadcast.

In another approach, method 400 additionally and/or optionally includes establishing a scope of the architecture and a topology of the architecture, based at least in part on the information e.g. determining data path(s) for communicating information between resources of the network according to specific protocol(s) such as FCoE, lossless Ethernet, pure Ethernet, etc. based at least in part on the information.

In still another approach, method 400 additionally and/or optionally includes detecting one or more configuration errors between a plurality of virtual switches based at least in part on the vTLV message. For example, based on the vTLV message and/or additional information defining the various data paths in the network, it is possible to determine whether any resources of the network are part of a data path that requires one or more particular functionalities, such as FCoE functionalities for a storage area network (SAN). It is further possible to determine whether the data path includes any resources that do not support the particular functionalities required for the data path, and report this information as a configuration error, in some approaches.

In one embodiment, method 400 additionally and/or optionally includes prioritizing one or more data frames based on an encapsulation of data in the data frame. For instance, in one embodiment a fabric configuration includes a FCoE frame that is encapsulated in an underlay, which may be any existing or pending industry standard underlay such as a virtual exchange local area network (VXLAN). If a data frame traversing the network hits a resource such as a switch that doesn't understand underlay encapsulating the data, the data would problematically be unable to traverse that resource en route to its final destination. Accordingly, the presently disclosed inventive embodiments provide the ability to recognize all of the prior frame encapsulation stages of data without changing the underlying hardware. Rather, in one approach any necessary modifications are implemented exclusively in software.

In yet another embodiment, method 400 additionally and/or optionally includes moving at least one virtual machine from a first physical location in the architecture to a second physical location in the architecture, e.g. a first resource to a second resource, resources further comprising processors, storage media, caches, etc.; and logging the at least one virtual machine in to a target FCF VLAN. Notably, the target FCF VLAN is identical for both the first physical location and the second physical location. Thus, the presently disclosed embodiments enable the movement of virtual machines among various physical locations in an architecture without changing the target VLAN the virtual machine uses to log in.

Method 400 may also additionally and/or optionally include adding one or more data center bridging exchange (DCBX)-enabled virtual switches to the architecture, where adding the DCBX-enabled virtual switches to the architecture does not disrupt a topology of the architecture, i.e. DCBX-enabled virtual switches may be added to legacy architectures which may or may not support DCBX without breaking the legacy architecture scope or topology.

As noted above, the presently disclosed concepts may be equally embodied in a system, which in one embodiment includes a processor; and logic integrated with and/or executable by the processor. Furthermore, the logic is adapted to assign a VLAN type to each of a plurality of VLANs of a network; generate a VLAN list type-length-value (vTLV) message; and transmit information to resources based at least in part on the vTLV message. Resources of the system include at least one virtual switch and one or more of: a physical switch; a virtual port; a physical port; a virtual machine; a converged network adapter (CNA); and a fibre channel forwarder (FCF).

Similarly, the presently disclosed concepts may be equally embodied in and/or as a computer program product. In one embodiment, an exemplary computer program product includes a computer readable storage medium having program code embodied therewith, the program code readable/executable by a processor to: assign a VLAN type to each of a plurality of VLANs of a network; generate a VLAN list type-length-value (vTLV) message; and transmit information to resources based at least in part on the vTLV message. Suitable resources include at least one virtual switch and one or more of: a physical switch; a virtual port; a physical port; a virtual machine; a converged network adapter (CNA); and a fibre channel forwarder (FCF).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    assigning a virtual local area network (VLAN) type to each of a plurality of VLANs of an architecture;
    generating a VLAN list type-length-value (vTLV) message based at least in part on the assigned VLAN types, the vTLV message comprising at least one device entry, each device entry corresponding to at least one of the VLANs; and
    exchanging information with resources based at least in part on the vTLV message,
    wherein the resources comprise at least one virtual switch and at least one physical switch residing along a same data path of the architecture, and
    wherein each device entry represents, according to a type-length-value (TLV) convention: a VLAN identifier; a VLAN traffic priority level; a VLAN protocol indicator; a number of VLANs assigned to one or more particular protocols; and a VLAN identifier of each VLAN assigned to one of the particular protocols.

2. The method as recited in claim 1, further comprising modifying a traffic priority level of one or more of the VLANs based on the vTLV message.

3. The method as recited in claim 1, wherein the information corresponds to functionalities supported by the resources, the functionalities comprising one or more functionalities selected from the group of functionalities consisting of:
- lossless Ethernet functionalities;
- priority-based flow control (PFC) functionalities;
- enhanced transmission selection (ETS) functionalities;
- Quantized Congestion Notification (QCN) functionalities; and
- layer-two transport protocol (L2TP) functionalities.

4. The method as recited in claim 1, further comprising:
establishing a scope of the architecture based at least in part on the information, wherein the scope of the architecture comprises one or more of:
- a number of the resources available to the architecture,
- a type of each of the resources available to the architecture, and
- one or more capabilities of the resources available to the architecture; and establishing a topology of the architecture based at least in part on the information, wherein the topology of the architecture comprises one or more of:
- an absolute physical location of one or more of the resources available to the architecture;
- a relative location of one or more of the resources available to the architecture;
- a definition of one or more data paths of the architecture;
- an identification of one or more protocols supported along the one or more data paths; and
- an identification of one or more networks that one or more of the data paths traverse in whole or in part, and wherein the information is exchanged via a vDCBX protocol.

5. The method as recited in claim 4, further comprising modifying a traffic priority level of one or more of the VLANs based on the vTLV message, wherein the modifying comprises reassigning a VLAN priority level of the one or more VLANs in real-time without breaking:
- the topology of the architecture; and
- the scope of the architecture.

6. The method as recited in claim 1, further comprising assigning a VLAN traffic priority level to one or more of the VLANs.

7. The method as recited in claim 6, further comprising reserving at least one VLAN based at least in part on the VLAN type and/or the VLAN traffic priority level, wherein the reserving comprises one or more of:
- identifying a particular protocol required by one or more of the resources to exchange the information, and restricting the resources to the at least one VLAN, wherein the at least one VLAN supports the particular protocol;
- dedicating the at least one VLAN to perform an urgent task based on determining the at least one VLAN is characterized by a highest traffic priority level of the architecture; and
- dedicating the at least on VLAN to perform a scheduled task based on a priority schedule of the architecture.

8. The method as recited in claim 1, wherein the information is exchanged between adjacent resources, wherein the adjacent resources comprise a plurality of adjacent switch pairs, and
wherein at least some of the adjacent switch pairs comprise a physical switch adjacent to a virtual switch, the physical switch and the virtual switch being part of a same data path.

9. The method as recited in claim 1, wherein the VLAN type identifies one or more protocols supported by the VLAN.

10. The method as recited in claim 1, wherein the information corresponds to one or more of:
- functionalities supported by the resources; and
- a configuration of one or more of the resources;
wherein the configuration comprises one or more of:
- an identification of one or more physically or virtually connected resources,
- an identification of functionalities supported by one or more of the resources;
- an identification of one or more ports of one of the resources, the one or more ports supporting the functionalities supported by the resource; and
- an identification of one or more ports with which one of the resources is connected and/or in communication, and wherein the functionalities comprise one or more functionalities selected from the group of functionalities consisting of:
- lossless Ethernet functionalities;
- priority-based flow control (PFC) functionalities;
- enhanced transmission selection (ETS) functionalities;
- Quantized Congestion Notification (QCN) functionalities; and
- layer-two transport protocol (L2TP) functionalities.

11. The method as recited in claim 1, further comprising logically mapping one or more fabrics of the architecture using a component-aware encapsulation technique
wherein the logical mapping comprises one or more of:
- logically mapping a VLAN construct to an Infiniband construct or a PCI construct;
- logically mapping an Infiniband construct to a VLAN construct or a PCIe construct; and
- logically mapping a PCIe construct to a VLAN construct or an Infiniband construct.

12. The method as recited in claim 1, wherein the information is exchanged via inter-switch communications according to L2TP standards by broadcasting the vTLV message(s) to each switch in the architecture using L2TP.

13. The method as recited in claim 1, wherein the resources further comprise a plurality of the virtual switches, the method further comprising detecting one or more configuration errors between the plurality of virtual switches, wherein the one or more configuration errors comprise an indication that one or more of the virtual switches do not support a particular functionality required for a data path in which the one or more virtual switches reside.

14. The method as recited in claim 1, further comprising prioritizing one or more data frames based on an encapsulation of data in the data frame.

15. The method as recited in claim 1, further comprising:
- moving at least one virtual machine from a first physical location in the architecture to a second physical location in the architecture; and
- logging the at least one virtual machine in to a target fibre channel forwarder (FCF) VLAN,
  wherein the target FCF VLAN is identical for both the first physical location and the second physical location.

16. The method as recited in claim 1, wherein the architecture supports lossless Ethernet along at least one data path, and the method further comprising: adding one or more data center bridging exchange (DCBX)-enabled virtual switches to the at least one data path supporting lossless Ethernet, wherein adding the one or more DCBX-enabled virtual switches to the architecture does not disrupt a topology of the architecture.

17. The method as recited in claim 1, wherein the architecture is selected from the group consisting of: a PCI express (PCIe) fabric or an Infiniband fabric.

18. The method as recited in claim 1, wherein exchanging the information comprises:
receiving a message at a fibre channel forwarder (FCF) of the architecture;
responding to the message; and
receiving a confirmation message at the FCF,
wherein responding to the message comprises informing a converged network adapter (CNA) of the architecture how to log into the FCF, and
wherein the confirmation message indicates at least one of:
a VLAN associated with the FCF; and
a CNA port associated with the FCF.

19. A system comprising:
a processor; and
logic integrated with the processor and/or executable by the processor and stored in a computer readable storage device, the logic being configured to:
assign a virtual local area network (VLAN) type to each of a plurality of VLANs of an architecture;
generate a VLAN list type-length-value (vTLV) message, the vTLV message comprising at least one device entry, each device entry corresponding to at least one of the VLANs;
transmit information to resources based at least in part on the vTLV message; and
exchange information between the resources based at least in part on the vTLV message,
wherein each device entry represents, according to a type-length-value (TLV) convention:
a VLAN identifier;
a VLAN traffic priority level;
a VLAN protocol indicator;
a number of VLANs assigned to one or more particular protocols; and
a VLAN identifier of each VLAN assigned to one of the particular protocols, and wherein the resources comprise:
at least one virtual switch and at least one physical switch residing along a same data path of the architecture; and
one or more resources selected from the group of resources consisting of:
at least one virtual port;
at least one physical port;
at least one virtual machine;
at least one converged network adapter (CNA); or
at least one fibre channel forwarder (FCF).

20. A computer program product comprising a computer readable hardware storage device having program code embodied therewith, the embodied program code readable/executable by a processor to:
assign a VLAN type to each of a plurality of VLANs of an architecture;
generate a VLAN list type-length-value (vTLV) message; and
transmit information to resources based at least in part on the vTLV message; and
exchange information between the resources based at least in part on the vTLV message,
wherein the resources comprise:
at least one virtual switch, and at least one physical switch residing along a same data path of the architecture; and
one or more resources selected from the group of resources consisting of:
at least one virtual port;
at least one physical port;
at least one virtual machine;
at least one converged network adapter (CNA); or
at least one fibre channel forwarder (FCF), and
wherein exchanging the information comprises:
receiving a DCBX message via an intelligent unicast replication protocol at a FCF of the network;
responding to the message; and
receiving a confirmation message at the FCF.

* * * * *